CONVEYANCE LOADING APPARATUS

Filed Nov. 29, 1963 7 Sheets-Sheet 1

INVENTORS
JOSEPH C. WOLLARD
JOHN S. SLANEY
LESTER L. PREISS
BY
Shanley & O'Neil
ATTORNEYS

CONVEYANCE LOADING APPARATUS

Filed Nov. 29, 1963

INVENTORS
JOSEPH C. WOLLARD
JOHN S. SLANEY
LESTER L. PREISS
BY
Shanley & O'Neil
ATTORNEYS

CONVEYANCE LOADING APPARATUS

Filed Nov. 29, 1963 7 Sheets-Sheet 3

INVENTORS
JOSEPH C. WOLLARD
JOHN S. SLANEY
LESTER L. PREISS
BY
Shanley & O'Neil
ATTORNEYS INVENTORS
JOSEPH C. WOLLARD
JOHN S. SLANEY
LESTER L. PREISS
BY
Shanley & O'Neil
ATTORNEYS INVENTORS
JOSEPH C. WOLLARD
JOHN S. SLANEY
LESTER L. PREISS
BY
Shanley & O'Neil
ATTORNEYS

INVENTORS
JOSEPH C. WOLLARD
JOHN S. SLANEY
LESTER L. PREISS

BY Shanley & O'Neil
ATTORNEYS

CONVEYANCE LOADING APPARATUS

Filed Nov. 29, 1963

INVENTORS
JOSEPH C. WOLLARD
JOHN S. SLANEY
LESTER L. PREISS
BY
Shanley & O'Neil
ATTORNEYS

United States Patent Office 3,315,291

Patented Apr. 25, 1967

3,315,291

CONVEYANCE LOADING APPARATUS

Joseph C. Wollard, Miami Springs, John S. Slaney, Opa-locka, and Lester L. Preiss, Miami, Fla., assignors to Wollard Aircraft Service Equipment Inc., a corporation of Florida Filed Nov. 29, 1963, Ser. No. 326,771
5 Claims. (Cl. 14—71)

The present invention relates to aircraft loading apparatus, more particularly of the type in which an elongated gangway provides covered and weather-proof protection for passengers walking through the gangway, between an elevated door of an airport or other terminal building and an elevated door of an aircraft or other vehicle that is loading or unloading passengers.

It is an object of the present invention to provide aircraft loading apparatus adapted to register with aircraft doors in any of a plurality of positions of the aircraft.

Another object of the present invention is the provision of aircraft loading apparatus that is structurally strong and yet light in weight.

Still another object of the present invention is the provision of aircraft loading apparatus that permits ready movement of personnel between an elevated doorway of an aircraft and the ground immediately adjacent the aircraft, and at the same time provides an enclosed passenger gangway between the aircraft and a terminal building.

Finally, it is an object of the present invention to provide passenger gangways and particularly aircraft loading apparatus, which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which.

Figure 1:
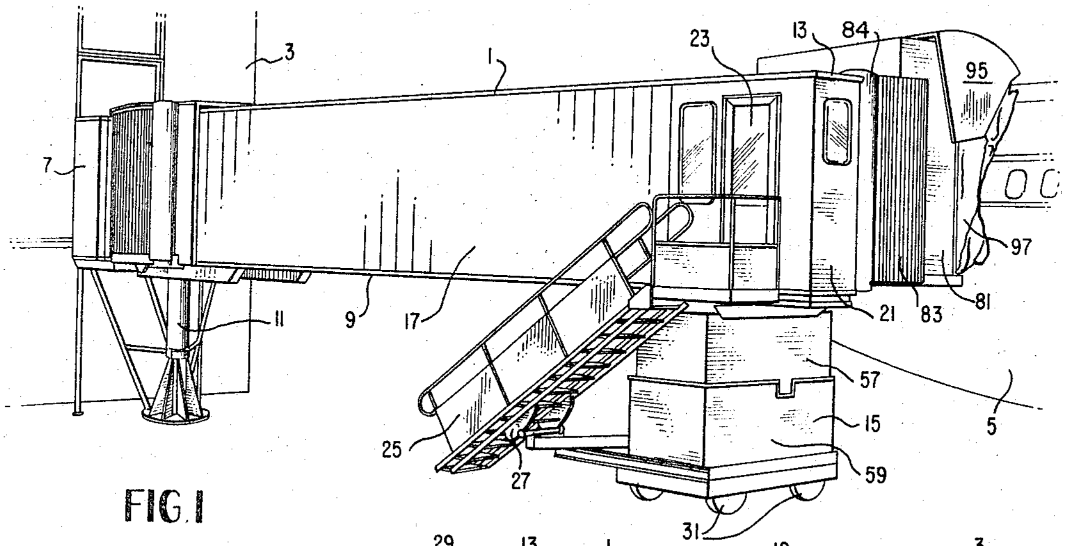
FIGURE 1 is a perspective view of a passenger gangway in operation between a passenger terminal and an aircraft.

Referring now to the drawings in greater detail, there is shown a passenger gangway 1 which is generally elongated and which extends between a fixed passenger terminal 3 such as an airport and a movable vehicle 5 such as an aircraft and shields passengers from the weather as they pass between the terminal and the vehicle. Gangway 1 has a fixed inner end portion 7 which is secured to the terminal and an elongated midportion 9 which occupies a principal portion of the length of the gangway. Midportion 9 is mounted for horizontal and vertical swinging movement on and relative to fixed inner end or terminal portion 7, by vestibule structure 8 which is described in greater detail below. For this purpose, an upright stand 11 is provided which supports at least a principal portion of the weight of terminal portion 7 vestibule structure 8 and midportion 9 of gangway 1 in the vicinity of the pivotal interconnection between these two latter portions.

At the other or outer or swinging end of gangway 1, there is a vestibule 13 adapted to register with a doorway of a vehicle such as an airplane. The vestibule is mounted on the outer end of midportion 9 for horizontal swinging movement, but not for vertical swinging movement, relative to midportion 9. At least a major portion of the weight of vestibule 13 and the free or swinging end of midportion 9 with which it pivotally interconnects is carried by a wheeled support 15 that is power-driven to move in an arc at the center of which is the upright axis of swinging movement of midportion 9 on terminal portion 7.

Midportion 9 is enclosed on all sides to protect passengers from the weather, and includes a pair of opposite sidewalls 17 and 19 that extend substantially full length of midportion 9. As a passenger walks from the terminal toward the vehicle, sidewall 17 is on his right and sidewall 19 is on his left. Midportion 9 terminates in a fixed endwall 21 that extends from the outer end of sidewall 17 to the left as viewed by a passenger moving toward the vehicle, that is, from the outer end of sidewall 17 toward the vehicle. Adjacent endwall 21, a doorway 23 extends through sidewall 17 and gives access to the upper landing of a stairway 25 that descends from adjacent doorway 23 to ground level. Stairway 25 is of the articulated parallelogram linkage type, in which the step treads are pivotally interconnected with elongated stairway members at their front and rear edges to form sides of parallelograms, so that the step treads remain level no matter what the inclination of stairway 25. Wheeled support 15 is vertically extensible to vary the height of the upper end of stairway 25, with the result that the stairway will be inclined at different angles at different times. Nevertheless, the treads of stairway 25 will remain horizontal. To assure that the lower end of stairway 25 is adjacent ground level at all times regardless of the elevation of its upper landing, cams 27 are carried by the underside of stairway 25 and rest against members carried by the lower or inextensible portion of wheeled support 15, the shape of the cams being so related to the position of the upper end of the stairway as to maintain the elevation of the lower end of the stairway substantially constant.

Vestibule 13 faces generally to the left as seen by a passenger walking toward the vehicle. Access between the gangway and the vehicle is provided by a plurality of doors 29, best seen in FIGURE 2, which face generally in that direction. Doors 29 are of an overall width, that is, a dimension lengthwise of the gangway, which is substantially greater than is necessary simply for the use of the passengers. This is because the gangway of the present invention is inextensible; that is, the vertical axis about which midportion 9 swings relative to terminal portion 7 and the vertical axis about which vestibule 13 swings relative to midportion 9 are a fixed distance apart and this fixed distance does not vary. The vertical axis at the inner end of the gangway remains always vertical, while that of the outer end of the gangway tilts somewhat as midportion 9 and vestibule 13 swing together vertically relative to fixed inner end or terminal portion 7. Apart from this, however, the relationship of these two axes is fixed. It is for this reason that the total width of doors 29 is greater than usual, so that variations in the position of the vehicle can be accommodated not by extension of the gangway as in the prior art, but rather by the fact that doors 29 are wide enough to provide a substantial margin of error in the placement of the vehicle for loading or unloading.

Turning now to the vehicle structure of wheeled support 15, and with particular reference to FIGURES 5–10, it will be seen that the wheeled support is supported by four wheels 31 that in turn are mounted on a horizontal underframe 33. The wheels are mounted in pairs, the wheels of each pair being coaxial. Each pair of wheels 31 is carried by a generally transversely extending bolster 35 which is interconnected with underframe 33 for relative horizontal swinging movement about a vertical axis disposed about midway of the length of each bolster 35. To this end, each underframe carries a depending horizontal pivot plate 37 and each bolster carries on its upper side a corresponding horizontal pivot plate 39, the pivot plates 37 and 39 being pivotally interconnected for horizontal swinging movement relative to each other about an upright bolt. The lower pivot plate 39, in turn, is mounted for vertical swinging movement about a horizontal axis disposed intermediate the length of bolster 35, by means of a horizontal pivot bolt 41. By this arrangement, the inclination of underframe 33 relative to bolsters 35 can be adjusted by manipulation of screw jacks 43 by which underframe 33 is adjustably supported adjacent each end of each bolster 35.

Figure 5:
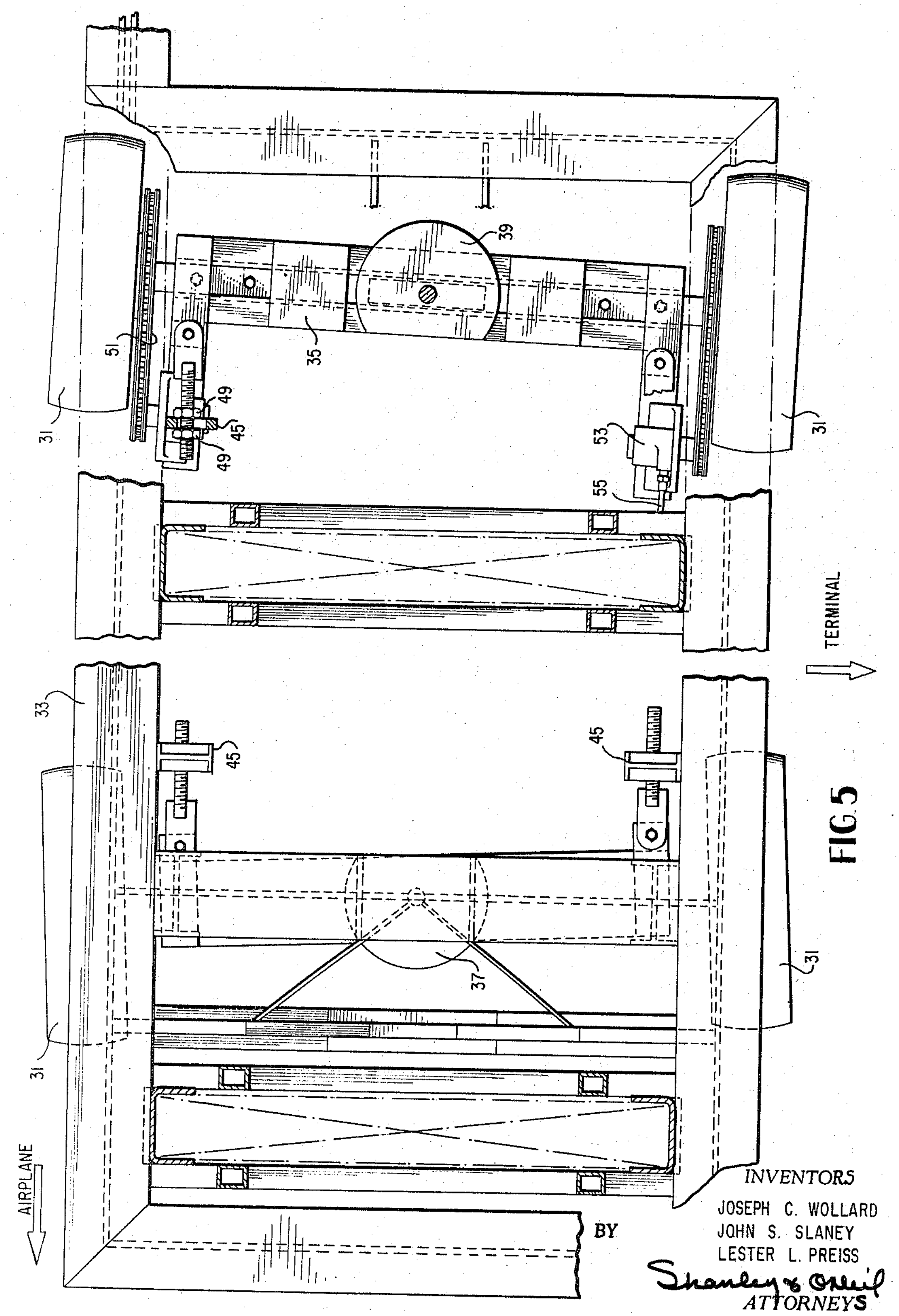
FIGURE 5 is a fragmentary plan view of the undercarriage and running gear of the wheeled support for the vehicle end of the apparatus of the present invention.
Figure 6:
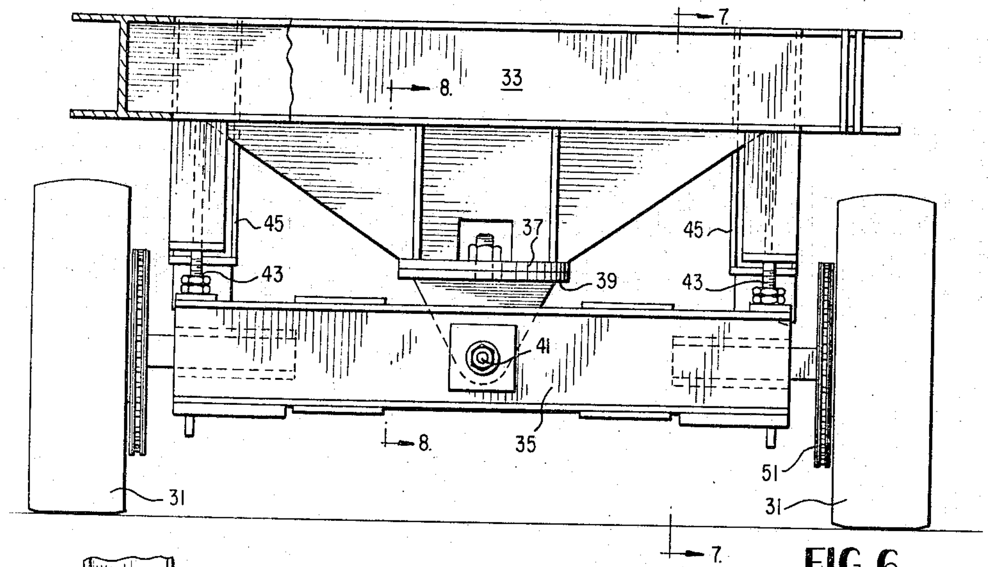
FIGURE 6 is an end elevational view of the running gear of the present invention.
Figure 7:
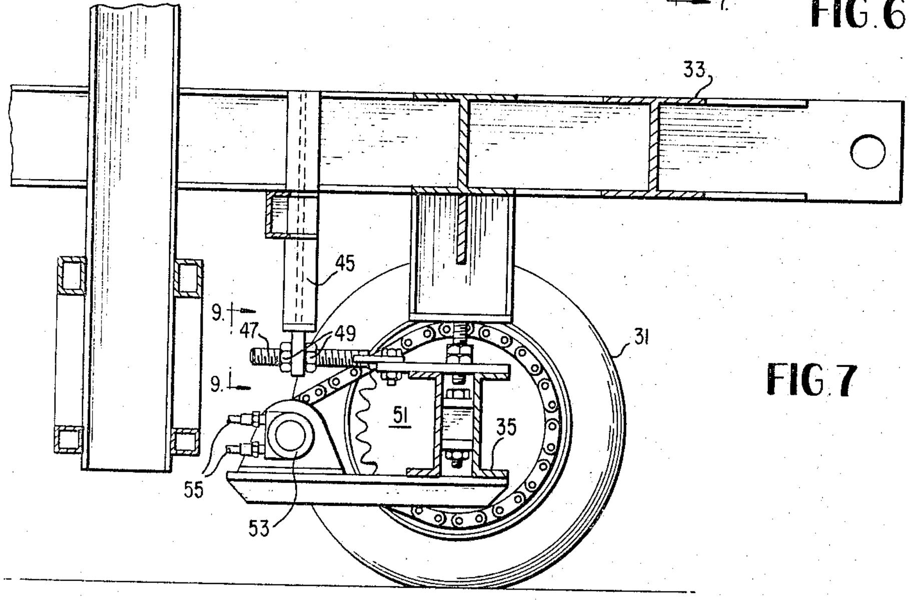
FIGURE 7 is a fragmentary cross-sectional view taken on the line 7—7 of FIGURE 6.
Figure 8:
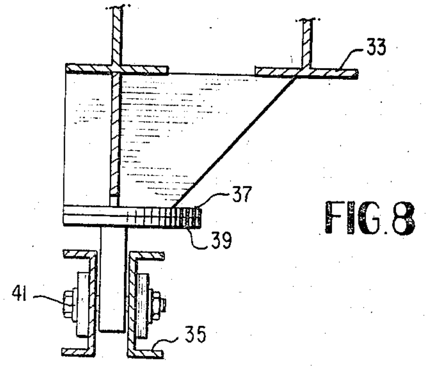
FIGURE 8 is a fragmentary cross-sectional view taken on the line 8—8 of FIGURE 6.
Figure 9:
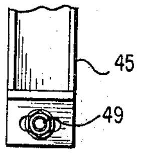
FIGURE 9 is a fragmentary cross-sectional view taken on the line 9—9 of FIGURE 7.

Members 45 also depend from both sides of underframe 33 adjacent each bolster 35 and have eyes through which are received screw-threaded arms 47 that are generally horizontally disposed and are pivotally interconnected at one end of each arm 47 to an end portion of each bolster 35. Nuts 49 are in screw-threaded engagement with screw-threaded arms 47 on either side of depending members 45 and manipulation of nuts 49 permits the attached end of bolster 35 to be drawn toward or pushed away from the associated depending member 45. In this way, the position of bolsters 35 can be adjusted about the vertical pivot of pivot plates 37 and 39, to any desired angular relationship as seen in FIGURE 5. Of course, if desired, only one assembly 45–49 can be provided for each bolster 35, instead of two as illustrated.

In operation, the positions of bolsters 35 will thus be adjusted by manipulation of nuts 49 on screw-threaded arms 47 so that the axes of all four wheels intersect the vertical axis of horizontal swinging movement of midportion 9 about terminal portion 7 of gangway 1. As seen in FIGURE 5, therefore, bolsters 35 will be so adjusted in position that they are not parallel to each other and so that the axes of some of the wheels 31 are disposed at an acute angle to the axes of some of the others of wheels 31. These adjusted positions of bolsters 35 are in turn fixed and maintained by nuts 49 on either side of depending members 45, so that wheels 31 are not free to swivel about any vertical axis but are free only to turn about their own axes. In this way, the only movement permitted to wheeled support 15 is arcuate movement about the axis of horizontal swinging of a major portion of gangway 1, so that wheeled support 15 imposes no longitudinal stress on gangway 1 by virtue of horizontal swinging movement of the gangway.

As mentioned above, the drive of wheeled support 15 is powered, and to this end, each wheel of at least one bolster is provided with a drive sprocket 51 about which a sprocket chain is trained that is driven from the relatively smaller drive sprocket of a fluid motor 53 to and from which fluid under pressure is conveyed by fluid lines 55 from a source of fluid under pressure (not shown).

The reason for the general arrangement of the parts adjacent the vehicle end of gangway 1 will now be clear. It will be noted from FIGURES 1, 5 and 10 that wheeled support 15 is elongated in its direction of travel, that is, elongated in a direction perpendicular to gangway 1. This relationship promotes stability of wheeled support 15 during its travel. At the same time, however, this relationship also coacts with the angular relationship of vestibule 13 to the length of midportion 9 of gangway 1. Moreover, the location of doorway 23 and stairway 25 is also important in relationship to the arrangement of wheeled support 15, for the arrangement of the upper landing of stairway 25, the outer end of midportion 9 and the vestibule 13 substantially in a line perpendicular to the length of gangway 1 makes it important that these parts be arranged as they are above wheeled support 15. In this way, it is feasible to provide a stairway 25 without further reinforcement of the overall structure. At the same time, vestibule 13 of gangway 1 does not interfere with doorway 23 and stairway 25, because they are on opposite sides of the outer end of midportion 9. By the same token, the provision of endwall 21 extending from sidewall 17, and the formation of sidewall 17 substantially longer than sidewall 19, provide a structure in which limited horizontal swinging movement of vestibule 13 relative to midportion 9 is made possible, between extreme positions in which vestibule 13 is disposed at an acute angle to the length of midportion 9.

Figure 10:
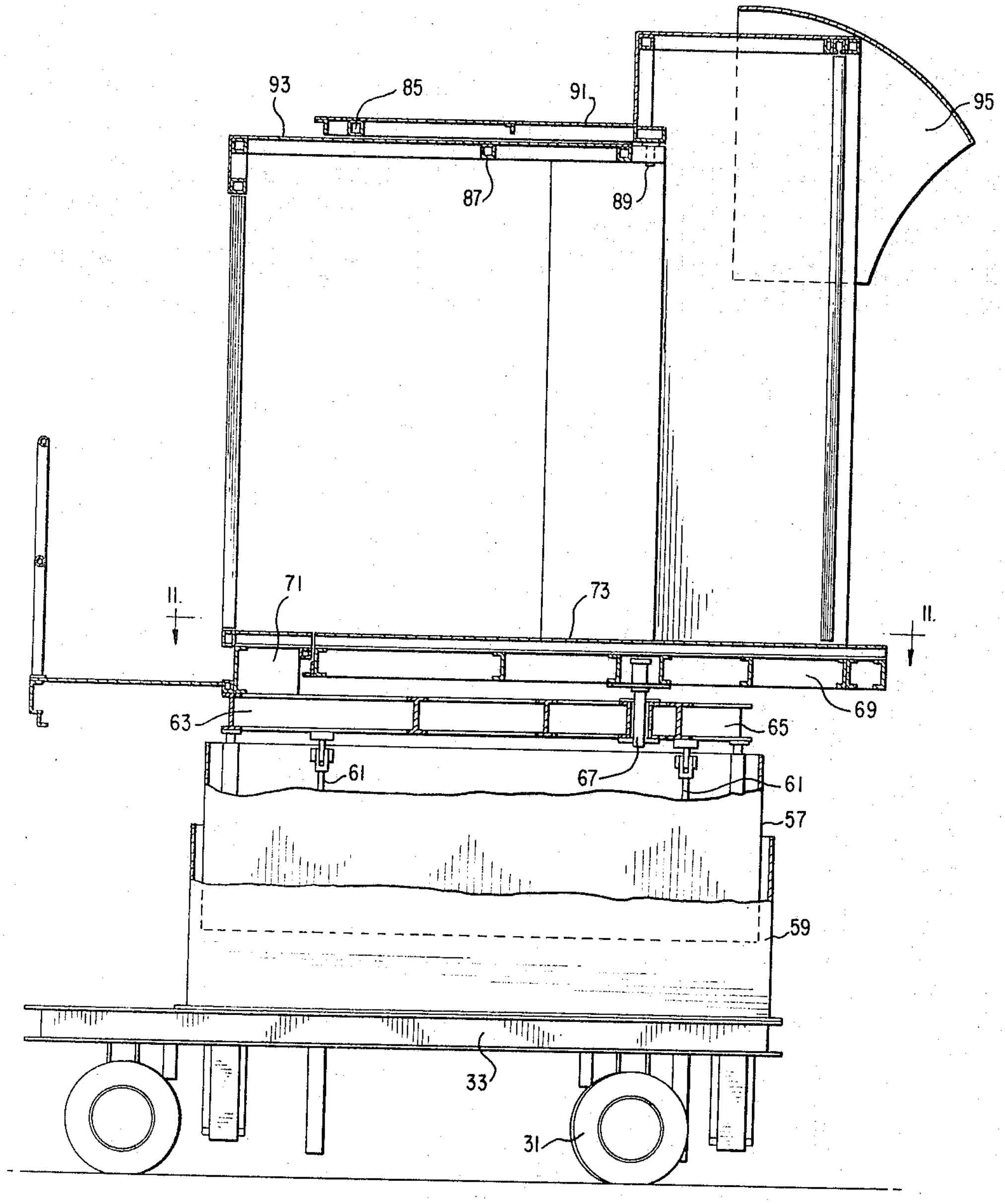
FIGURE 10 is a cross-sectional view in end elevation taken on the vehicle or aircraft end of the gangway of the present invention.

As perhaps can best be seen in FIGURE 10, wheeled support 15 is made up of a pair of vertically telescoping casing sections 57 and 59. Upper section 57 is movable relative to and telescopes within lower section 59. A lifting mechanism 61, indicated broadly in FIGURES 5 and 10, is provided for lifting the outer or swinging end of gangway 1 to cause it to swing vertically about its horizontal pivot adjacent fixed inner end portion 7 near the terminal building. Lifting mechanism 61 is described in greater detail in another of our copending applications filed under even date herewith, entitled "Aircraft Loader Elevating System," to which reference is had for a more complete description of this portion of the apparatus so as to avoid the unnecessary inclusion of detail in the present application.

Lifting mechanism 61 acts between underframe 33 of wheeled support 15, which remains at constant elevation, and an underframe 63 of the free or swinging end of gangway 1. Underframe 63 can thus swing vertically with gangway 1. Underframe 63 is shown in plan in FIGURE 11, and as can be seen in that figure, underframe 63 is provided with a lateral extension 65 that underlies vestibule 13, that is, that extends laterally outwardly to the left with regard to a passenger walking toward the vehicle. Lateral extension 65, in turn, carries a vertical pivot 67 shown in greater detail in FIGURE 16. It is on pivot 67 that vestibule 13 swings relative to midportion 9.

Figure 11:
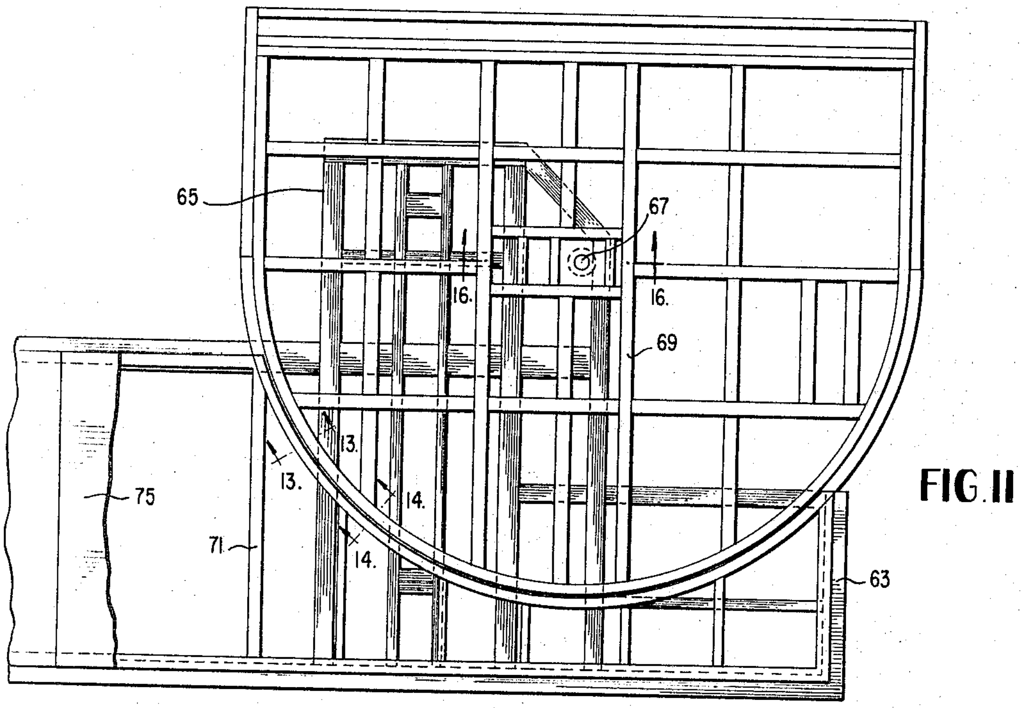
FIGURE 11 is a cross-sectional view taken on the line 11—11 of FIGURE 10.
Figure 12:
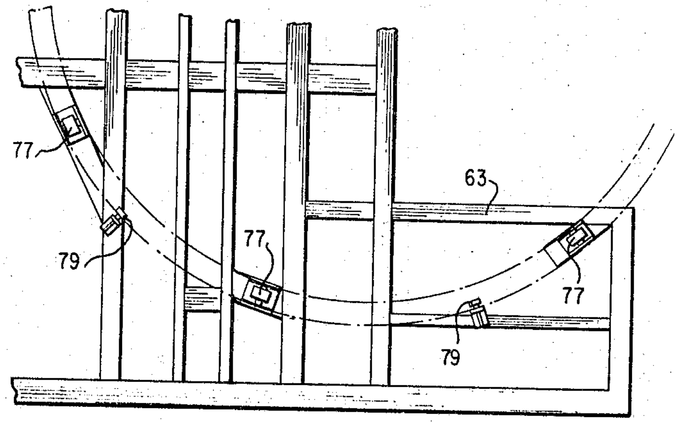
FIGURE 12 is a fragmentary view of an underportion of the structure of FIGURE 11, showing the anti-friction mounting of the vestibule at the vehicle end of the gangway of the present invention.
Figure 13:
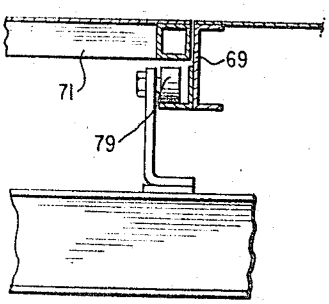
FIGURE 13 is an enlarged cross-sectional view, in elevation, taken on the line 13—13 of FIGURE 11.
Figure 14:
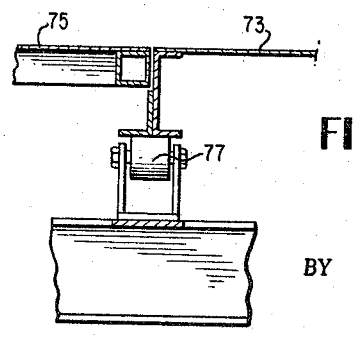
FIGURE 14 is a view similar to FIGURE 13 but taken on the line 14—14 of FIGURE 11.

Pivot 67 is secured to a flooring frame 69 for vestibule 13, as best seen in FIGURE 11. A fixed flooring frame 71 provides the flooring frame for elongated midportion 9. Flooring 73 of vestibule 13 is supported by flooring frame 69, while flooring 75 for elongated midportion 9 is supported by flooring frame 71. Flooring 73 is coplanar and flush with flooring 75. It is not necessary to close the crack between these flooring members, as they remain coplanar at all times although they swing relative to each other. The adjacent edges of flooring 73 and flooring 75 are arcuate about the axis of pivot 67, so that the crack between flooring 73 and flooring 75 is neither enlarged nor reduced in size during the swinging of the vestibule relative to midportion 9.

Figure 16:
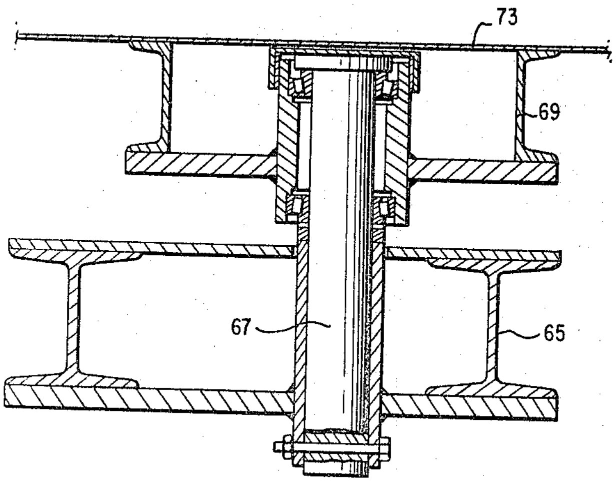
FIGURE 16 is an enlarged fragmentary elevational cross-sectional view taken on the line 16—16 of FIGURE 11.

The swinging movement of vestibule 13 relative to midportion 9 is accommodated not only by pivot 67 as seen in FIGURE 16, but also by supporting and hold-down rollers. Thus, as can be seen by comparison of FIGURES 11, 12, 13 and 14, rollers 77 are provided that support the marginal portions of flooring frame 69 of vestibule 13. At the same time, hold-down rollers 79 act on upper surfaces of flooring frame 69 to hold down the flooring frame and maintain it in its desired position coplanar with flooring frame 71 of midportion 9. Rollers 77 and 79 are carried by underframe 63 and are mounted for rotation on horizontal axes, that is, on axes parallel to flooring 73 and 75.

Vestibule 13 includes upright sidewalls 81 fixed to frame 69 and flexible sidewalls 83 that interconnect sidewalls 81 with the relatively fixed walls of midportion 9 of gangway 1. Thus, there is a flexible sidewall 83 on each side of vestibule 13. Flexible walls 83 are preferably mounted on spring-tensioned rollers within casings 84, 84 carried by the adjacent edges of the relatively stationary walls of midportion 9. Thus, each flexible wall 83 is attached at its free end to an inner or rear edge of each sidewall 81. One such roll of flexible wall 83 is within the casing 84 carried by the edge of endwall 21 that is remote from the outer end of sidewall 17, while the other roll of flexible wall 83 is within the casing 84 carried by the outer end of sidewall 19. Vestibule 13 can thus swing from side to side of its medial or perpendicular position relative to the length of gangway 1, without opening either side of vestibule 13 to the weather. At the same time, because side walls 81 are straight whereas casings 84 are positioned on the arcs of a circle the center of which is at 89, each casing 84 will engage each associated wall 81 as each flexible wall 83 rolls up on its spring-tensioned roller to its point of attachment to wall 81. This contact between each wall 81 and the associated casing 84 will act to prevent further swinging movement of vestibule 13 as further described below.

Figure 15:
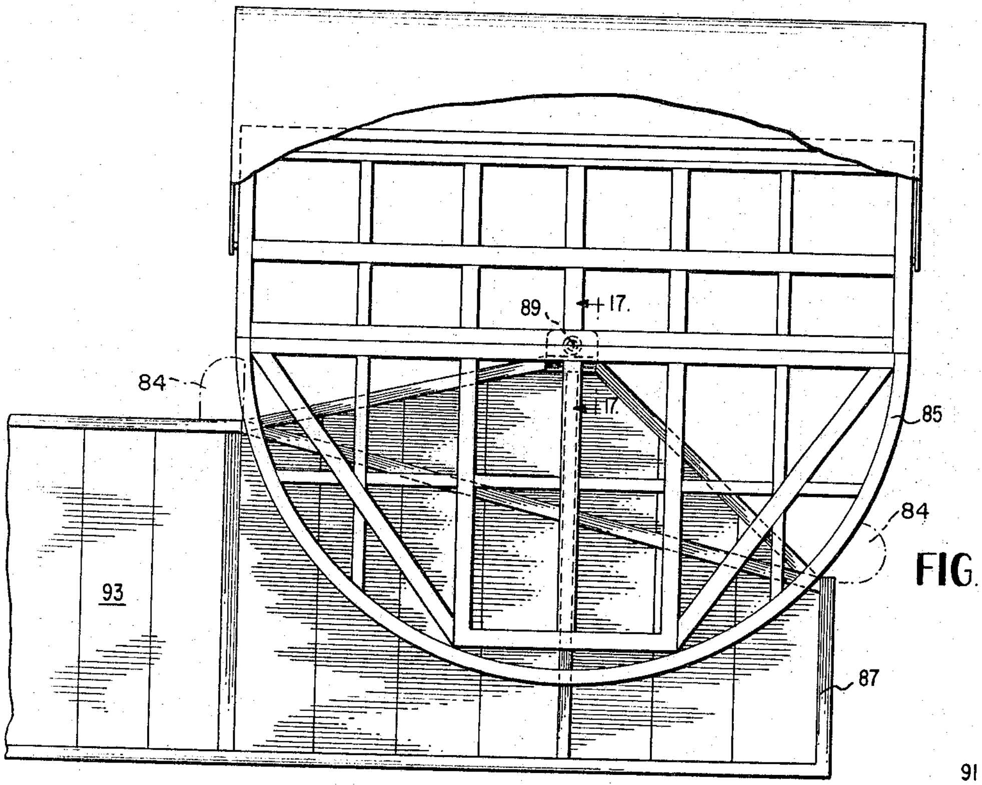
FIGURE 15 is a top plan view of the same portion of the passenger gangway of the present invention as in FIGURE 11, but showing some of the roofing removed.
Figure 17:
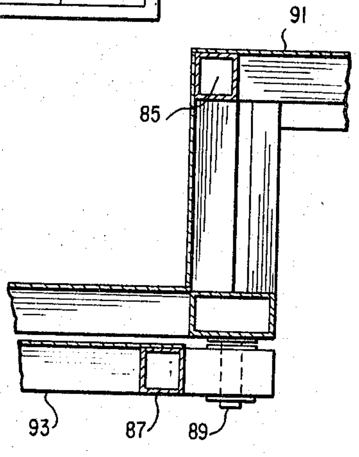
FIGURE 17 is an enlarged fragmentary elevational cross-sectional view taken on the line 17—17 of FIGURE 15.

Vestibule 13 is also provided with a roofing frame 85 that can be seen in elevation in FIGURES 10 and 17 and in plan in FIGURE 15. Roofing frame 85 overlies the roofing frame 87 of midportion 9. The roofing frame 87 of midportion 9, in turn, has a lateral extension that can be seen in FIGURE 15 and that carries a vertical pivot 89 by which roofing frames 85 and 87 are interconnected for relative pivotal movement. Pivot 89 is coaxial with pivot 67. Roofing 91 is carried by the swinging roofing frame 85, while roofing 93 is carried by the relatively fixed roofing frame 87. Roofing frame 85 and roofing 91 have a generally semi-circular portion overlying the roof of midportion 9, as can be seen in FIGURE 15, so that the roof of vestibule 13 will be closed to the weather in all horizontally swung positions of vestibule 13.

Figures 2, 3, 4:
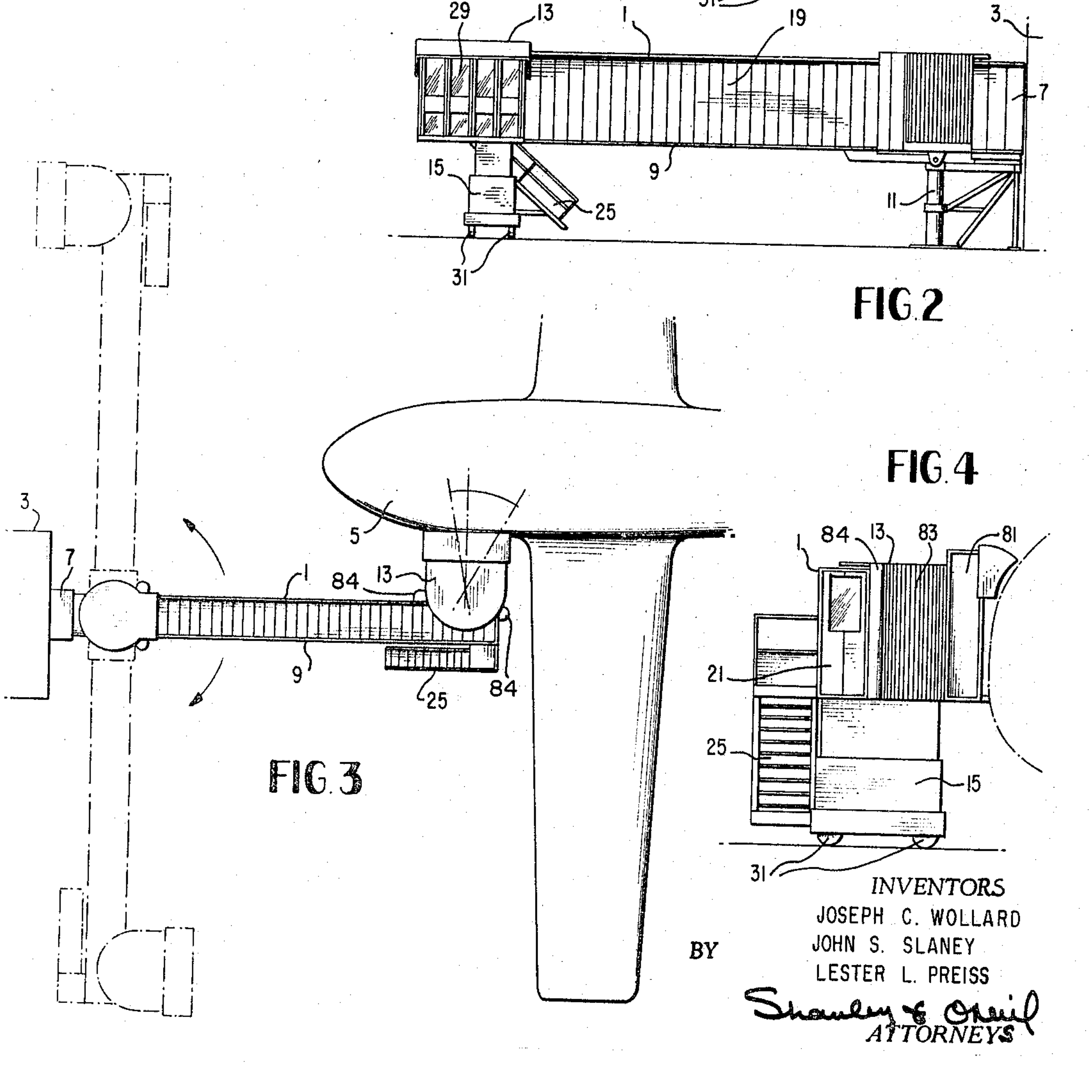
FIGURE 2 is a side elevational view of the structure shown in FIGURE 1, viewed from the vehicle or opposite side from FIGURE 1.
FIGURE 3 is a somewhat schematic plan view of apparatus according to the present invention, showing the range of adjustive positions of which the apparatus of the present invention is capable.
FIGURE 4 is an end elevational view of a gangway according to the present invention in use in connection with an airplane.

With regard to an imaginary vertical plane passing through pivots 67 and 89 and disposed perpendicular to the length of midportion 9, vestibule 13 is thus swingable thru an acute angle in either direction from that plane, negative toward, and positive away from, the terminal, as shown diagrammatically in FIGURE 3. Stated another way, vestibule 13 is swingable so that doors 29 form acute angles in either direction from their position in which they are parallel to the length of midportion 9.

The passenger gangway of the present invention is adapted for use with vehicles such as airplanes having doorways of various heights, as can be seen from the provision of means for adjusting the height of the free or swinging end of the passageway of the present invention. At the same time, it is recognized that the vehicles such as aircraft with which the present invention is used will not all have the same shape, that is, their passenger doorways will not be all at the same position on the aircraft nor will the aircraft adjacent the doorway be of uniform configuration. Therefore, provision is also made by the present invention for closing the passageway against the weather regardless of the shape of the vehicle being loaded or unloaded. To this end, a swinging hood 95 is provided that is carried above doors 29 and that has depending flexible curtains 97 that are secured to the lower portions of hood 95 and also to the forward or free edges of sidewalls 81. Hood 95 and curtains 97 thus surround and close the aircraft or other vehicle doorway from the weather before the passengers enter or leave the aircraft or other vehicle.

Figures 18, 19:
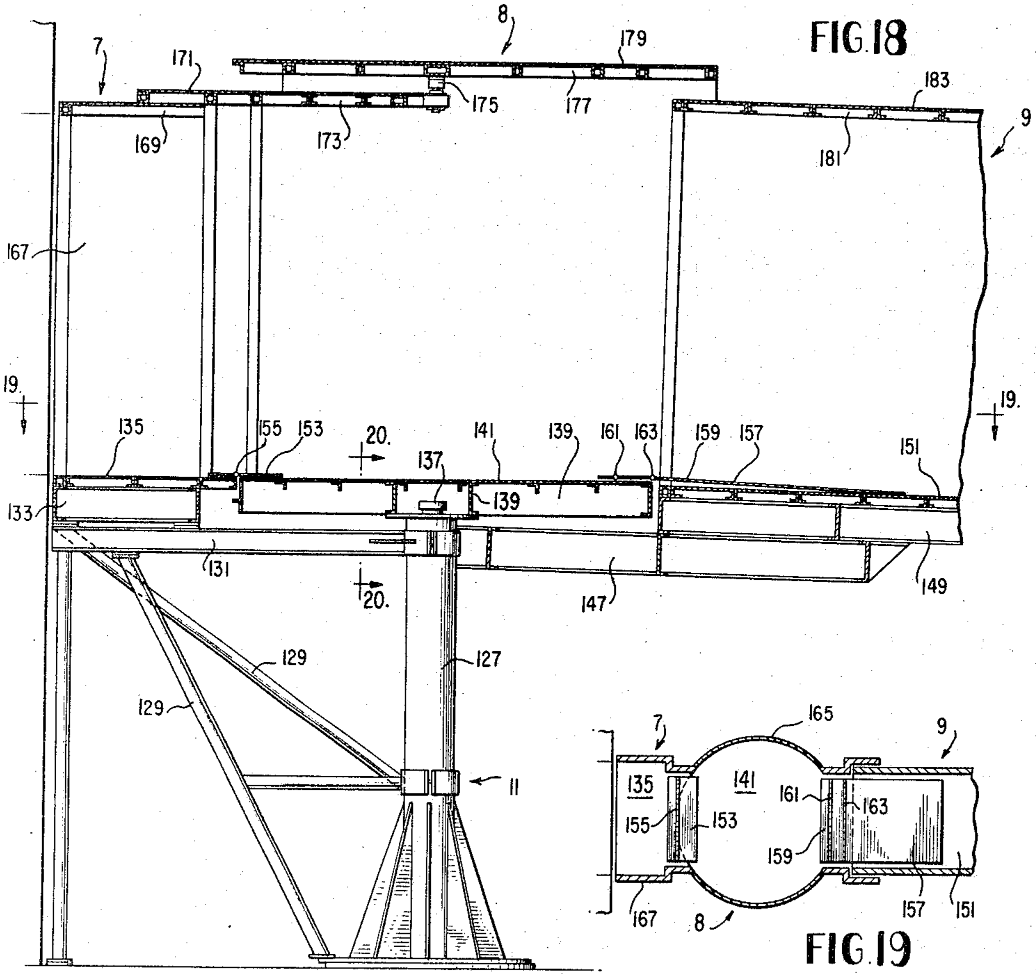
FIGURE 18 is an elevational view in section of the combined pivot and hinge structure at the terminal end of the gangway.
FIGURE 19 is a reduced cross-sectional plan view taken on the line 19—19 of FIGURE 18.
Figure 20:
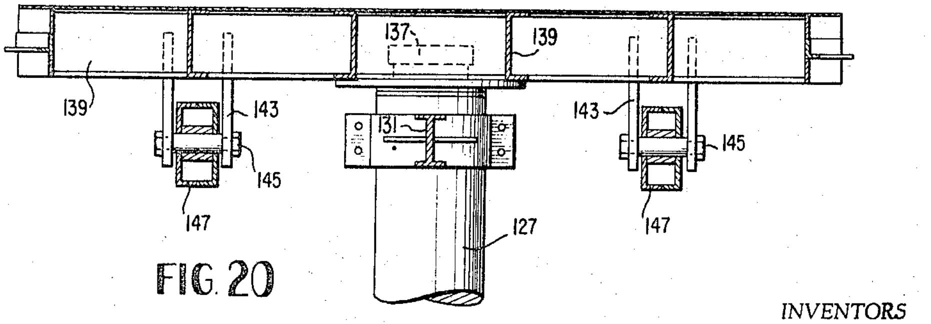
FIGURE 20 is an enlarged fragmentary cross-sectional elevational view taken on the line 20—20 of FIGURE 18.

Referring now to the horizontal and vertical swinging movement hinge connection between stand 11 and the gangway portions 8 and 9, as illustrated in FIGURES 18, 19 and 20, stand 11 is characterized by pedestal 127 that is rigidly interconnected with a plurality of diagonally extending braces 129 that extend between lower portions of the pedestal 127 and a generally horizontal underframe 131 for the terminal end of gangway 1.

Underframe 131 carries a flooring frame 133 of fixed inner end portion 7 of gangway 1. Flooring frame 133 in turn carries flooring 135 for the interior of the gangway.

As is best seen in FIGURE 18, pedestal 127 also carries, axially of itself, a vertical pivot 137 by which vestibule 8 is mounted for horizontal swinging movement relative to fixed inner end portion 7 about a vertical axis coaxial with pedestal 127. Pivot 137 carries a horizontal flooring frame 139 of vestibule 8. Flooring frame 139 is generally circular in plan and rotates always in a horizontal plane regardless of the adjusted position of gangway 1. Flooring frame 139 of vestibule 8 also carries horizontal flooring 141 that is flush and coplanar with the flooring 135 of flooring frame 133 of fixed inner end portion 7. Flooring 135 and 141 terminate adjacent each other in arcuate edges that have their centers at the axis of pivot 137. Thus, the crack between flooring 135 and flooring 141 can be relatively small and does not change in size with the movement of vestibule 8 relative to end portion 7, as the only movement of vestibule 8 is horizontal swinging movement about the vertical axis of pivot 137.

Two pairs of ears 143 are fixed to flooring frame 139 and depend therefrom. The pairs of ears are disposed on opposite sides of pivot 137. Ears 143 carry between them horizontal coaxial axles 145 the axes of which pass through the axis of pivot 137 and are perpendicular to the axis of pivot 137. Axles 145 carry generally horizontally disposed, outwardly extending arms 147 for vertical swinging movement thereon. Arms 147 at their outer ends support a generally horizontal flooring frame 149 for elongated outer portion 9. Flooring frame 149 carries flooring 151 which is generally horizontal. However, as elongated outer portion 9 swings vertically about the axis of axles 145, flooring 151 does not remain coplanar or flush with flooring 141 of vestibule 8.

Vestibule 8 and elongated outer portion 9 swing horizontally with each other. There is no horizontal swinging movement of one relative to the other. There is only vertical swinging movement of elongated outer portion 9 relative to vestibule 8. For this reason, and for other reasons that will soon appear, the crack between flooring 141 of vestibule 8 and flooring 151 of elongated outer portion 9 is straight and parallel to the axis of vertical swinging movement of elongated outer portion 9.

To close the crack between the flooring 135 of fixed inner end portion 7 and the flooring 141 of vestibule 9, a pair of bridge plates 153 are provided that are interconnected by a horizontal hinge 155 disposed perpendicular to the length of the gangway. Bridge plates 153 are thus enabled to swing relative to each other to accommodate any small irregularities in the contour of flooring 135 and 141 relative to each other.

Of considerably more significance is the fact that between flooring 141 of vestibule 8 and flooring 151 of elongated outer portion 9, a ramp 156 is provided so as to present to passengers a smooth and unbroken floor surface from vestibule 8 to elongated outer portion 9 regardless of the vertically swung position of elongated outer portion 9 relative to vestibule 8. Ramp 157 is comprised of at least three bridge plates 159 interconnected for vertical swinging movement relative to each other by a pair of horizontal hinges 161 and 163 that are parallel to each other and to the crack between the flooring 141 of vestibule 8 and the flooring 151 of elongated outer portion 9, and are also parallel to but spaced outwardly of and above the horizontal axis of vertical swinging movement of elongated outer portion 9. The arrangement and function of bridge plates 159 is quite important. Thus, as can be seen from a consideration of FIGURE 18, when elongated outer portion 9 is vertically swung to a position in which flooring 151 is lower than flooring 141, the outermost bridge plate 159 will simply swing downwardly as shown in FIGURE 18 about hinge 163. However, when elongated outer portion 9 is swung upwardly so that flooring 151 is higher than flooring 141, then the outermost bridge plate 159 tends to rest flat on flooring 151 while the two innermost bridge plates 159 tend to swing about hinges 161 and 163 to positions in which a smooth and unbroken flooring surface is nevertheless presented to the passengers.

Fixed inner end portion 7 is provided with a roof frame 169 that carries roofing 171. Fixed inner end portion 7 also has a forward extension 173 of its roof frame 169. Forward extension 173 carries a vertical pivot 175 that is swingably interconnected with a generally circular roof frame 177 of vestibule 8 for horizontal swinging movement of roof frame 177 relative to forward extension 173 about a vertical axis coaxial with pivot 137. Roof frame 177 overlies forward extension 173 and is covered by roofing 179 so that vestibule 8 is closed from the top against the weather.

Elongated outer portion 9 is provided with a roof frame 181 covered by roofing 183 which closes portion 9 to the weather. However, roof frame 181 is unconnected with roof frame 177, so that roof frame 181 can swing efreely vertically with portion 9 relative to roof frame 177. It should be noted, however, that roofing 179 of vestibule 8 overlies roofing 183 of outer portion 9 a substantial distance lengthwise of the gangway so that the gap between vestibule 8 and outer portion 9 is closed to the weather in all vertically swung positions of outer portion 9 relative to vestibule 8. To this end also, roof frame 177 of vestibule 8 is spaced a substantial distance above roof frame 181 of outer portion 9.

In use, therefore, it will be apparent that the gangway of the present invention is ordinarily maintained in a position such as the lower broken line position shown in FIGURE 3 when no aircraft is to be loaded or unloaded. When an aircraft taxis adjacent the terminal building to receive or discharge passengers, the aircraft is stopped, for example, in the position shown in FIGURE 3. The various swung positions of gangway 1 and the extra width of doors 29 makes it possible to position the aircraft in any of a plurality of positions for cooperation with gangway 1.

With the aircraft at rest adjacent the terminal, the fluid motors 53 of wheeled support 15 are then actuated to drive the free end of gangway 1 into close adjacency with the passenger door of the aircraft. When gangway 1 has reached its full line position in FIGURE 3, lifting mechanism 61 is actuated to raise or lower the free end of gangway 1 until flooring 73 and 75 is at an appropriate level, and vestibule 13 is swing horizontally by power means (not shown) until doors 29 are parallel to the aircraft doorway. Hood 95 and curtains 97 are positioned against the aircraft about the aircraft doorway to close the doorway from the weather, after which the aircraft doorway can be opened and passengers can pass back or forth between the aircraft and the terminal without having to descend stairs from the aircraft or be exposed to the weather. Similarly, crew members and aircraft or airport service personnel can freely pass between the interior and the exterior of the aircraft by using doorway 23 and stairway 25.

After the loading or unloading operation is complete, fluid motors 53 can simply be reversed so as to swing wheeled support 15 and the free end of gangway 1 back to a position of nonuse, such as the lower phantom line position of FIGURE 3.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of hte invention, as those skilled in this art will readily understand. Such modifications and variations are considered to be within the purview and scope of the present invention as defined by the appended claims.

What is claimed is:

1. A conveyance gangway comprising (a) a fixed terminal end, (b) an inextensible, elongated midportion including supporting wheel means therefor, (c) means swingably interconnecting the fixed terminal end and the elongated midportion for horizontal swinging movement of the elongated midportion relative to the terminal end about a vertical first axis, (d) a conveyance end portion, (e) means swingably interconnecting the conveyance end portion and the elongated midportion for substantially horizontal swinging movement of the conveyance end portion relative to the elongated midportion about a second axis, (f) the conveyane end portion extending laterally of the elongated midportion, (g) means acting between the conveyance end portion and the midportion limiting horizontal swinging movement of the conveyance end portion relative to the elongated midportion to movement between extreme positions in which the conveyance end portion is disposed at negative and positive acute angles to a plane passing through the second axis and perpendicular to the length of the elongated midportion.

2. A conveyance gangway as claimed in claim 1

(a) the conveyance end portion having a doorway for registering with the doorway of a conveyance, the conveyance end portion doorway having a width in the neighborhood of twice the width of the midportion.

3. A conveyance gangway comprising:

(a) at an elongated portion, (b) means mounting the elongated portion for substantially horizontal swinging movement about a vertical first axis, (c) a conveyance end portion,
(d) means swingably interconnecting the conveyance end portion with the elongated portion for substantially horizontal swinging movement of the conveyance end portion relative to the elongated portion about a second axis,
(e) the conveyance end portion extending laterally of the elongated portion,
(f) the elongated portion having a pair of side walls, one being substantially shorter than the other, and
(g) an endwall extending from the conveyance end of the other side wall toward the conveyance end portion of the gangway,
(h) the conveyance end of the one side wall and the end of the end wall nearest the conveyance end portion being each contiguous to the conveyane end portion when the conveyance end portion is disposed at negative and positive acute angles, respectively, to a plane which includes the second axis and which is perpendicular to the length of the elongated portion.

4. A conveyance gangway as claimed in claim 3
(a) the conveyance end portion having a doorway for registering with the doorway of a conveyance, the conveyance end portion doorway having a width in the neighborhood of twice the width of the elongated portion.

5. A conveyance gangway comprising:
(a) an elongated portion having a terminal end, a conveyance end and a sidewall,
(b) ground supported means for raising and lowering the conveyance end of the elongated portion, (c) a doorway in the sidewall of the elongated portion,
(d) a stairway leading from the doorway downwardly toward the ground,
(e) hinge means carried by the elongated portion supporting the upper end of the stairway, and
(f) cooperative means carried by the ground supported means and the lower portion of the stairway supporting the lower portion of the stairway with the lower end thereof in proximity to but spaced from the ground,
(g) the cooperative means including two relatively movable elements which coact to maintain the spacing of the lower end of the stairway and the ground substantially uniform as the elongated portion moves up and down.

References Cited by the Examiner

UNITED STATES PATENTS

| | | | |
|---|---|---|---|
| 1,590,317 | 6/1926 | Richards | 14—71 |
| 2,688,761 | 9/1954 | Good | 14—71 |
| 2,875,457 | 3/1959 | Read | 14—71 |
| 3,060,471 | 10/1962 | Deryuen | 14—71 |
| 3,110,048 | 11/1963 | Bolton | 14—71 |

CHARLES E. O'CONNELL, *Primary Examiner.*

ERNEST R. PURSER, *Examiner.*

N. C. BYERS, *Assistant Examiner.*